United States Patent
Gordon et al.

(10) Patent No.: US 8,673,129 B2
(45) Date of Patent: Mar. 18, 2014

(54) HIGH-THROUGHPUT CAVITATION AND ELECTROCOAGULATION APPARATUS

(75) Inventors: Roman Gordon, Studio City, CA (US); Igor Gorodnitsky, Marina del Rey, CA (US); Maxim A. Promtov, Tambov (RU)

(73) Assignee: Cavitation Technologies, Inc., Chatsworth, CA (US)

( * ) Notice: Subject to any disclaimer, the term of this patent is extended or adjusted under 35 U.S.C. 154(b) by 499 days.

(21) Appl. No.: 12/976,253

(22) Filed: Dec. 22, 2010

(65) Prior Publication Data

US 2011/0147231 A1 Jun. 23, 2011

Related U.S. Application Data

(60) Provisional application No. 61/289,678, filed on Dec. 23, 2009.

(51) Int. Cl.
*C02F 1/46* (2006.01)

(52) U.S. Cl.
USPC ............ 205/755; 205/756; 205/757; 205/761

(58) Field of Classification Search
USPC .................................. 205/755, 756, 757, 761
See application file for complete search history.

(56) References Cited

U.S. PATENT DOCUMENTS

| | | | |
|---|---|---|---|
| 4,321,125 A | 3/1982 | Nazarian et al. | |
| 4,329,211 A | 5/1982 | Plantes et al. | |
| 4,990,260 A | 2/1991 | Pisani | |
| 5,326,468 A | 7/1994 | Cox | |
| 5,393,417 A | 2/1995 | Cox | |
| 5,928,493 A | 7/1999 | Morkovsky et al. | |
| 6,139,710 A | 10/2000 | Powell | |
| 6,294,061 B1 | 9/2001 | Morkovsky et al. | |
| 6,325,916 B1 | 12/2001 | Lambert et al. | |
| 6,488,835 B1 | 12/2002 | Powell | |
| 6,582,592 B2 | 6/2003 | Arnaud | |
| 6,689,271 B2 | 2/2004 | Morkovsky et al. | |
| 6,797,179 B2 | 9/2004 | Arnaud | |
| 6,902,674 B2 | 6/2005 | Hattori et al. | |
| 6,902,678 B2 | 6/2005 | Tipton | |
| 7,087,176 B2 | 8/2006 | Gavrel et al. | |
| 7,211,185 B2 | 5/2007 | Powell | |
| 7,486,248 B2 | 2/2009 | Halek et al. | |
| 7,762,715 B2 | 7/2010 | Gordon et al. | |
| 2001/0004063 A1 | 6/2001 | Oh | |

(Continued)

FOREIGN PATENT DOCUMENTS

RU 2316481 C2 2/2008

*Primary Examiner* — Arun S Phasge
(74) *Attorney, Agent, or Firm* — Kelly & Kelley, LLP (57) ABSTRACT

The invention relates to a cavitation and electrocoagulation reactor comprising a hollow cylindrical cathode having a cylindrical anode coaxially disposed therein to form an annular interelectrode gap between the contact surfaces. An inlet sleeve and an outlet sleeve disposed in the respective inlet and outlet of the cathode and abutting against opposite ends of the anode seal the interelectrode gap from the respective inlet and outlet of the cathode. A set of channels disposed in the wall of the inlet sleeve connect the inlet to the interelectrode gap. Similarly, a set of openings disposed in the outlet sleeve connect the interelectrode gap to the cathode outlet. An electrical source has first and second terminals respectively connected to the anode and the cathode. The method for removing contaminants from a contaminated fluid flow involves the simultaneous application of hydrodynamic cavitation and electrocoagulation to the contaminated fluid flow.

9 Claims, 5 Drawing Sheets

(56) References Cited

U.S. PATENT DOCUMENTS

| | | |
|---|---|---|
| 2002/0020631 A1 | 2/2002 | Gavrel et al. |
| 2003/0136686 A1 | 7/2003 | Herbst |
| 2003/0173300 A1 | 9/2003 | Bradley |
| 2005/0224338 A1* | 10/2005 | Kin et al. ............ 204/230.2 |
| 2006/0081541 A1 | 4/2006 | Kozyuk |
| 2007/0102371 A1 | 5/2007 | Bhalchandra et al. |
| 2008/0029462 A1 | 2/2008 | Huymann |
| 2009/0008269 A1 | 1/2009 | Heiss |

* cited by examiner

HIGH-THROUGHPUT CAVITATION AND ELECTROCOAGULATION APPARATUS

BACKGROUND OF THE INVENTION

The invention relates to an apparatus and method of purification and treatment of potable water, ground water, industrial water, sewage water, etc. and finds numerous applications in drinking water production, food, chemical, oil, energy, wood, pulp and paper industries, mining and metal-processing and similar industries. Removable contaminants include metals, petroleum products, colloidal particles, living species, organics, dyes, polymers, surface-active compounds and other matter whose concentration can be decreased to the allowable levels in one pass through the present apparatus. The proposed water treatment method and the device generate changes in the fluidic flow's velocity, pressure, temperature, voltage, resistance and chemical composition and physical properties in order to reduce the concentration of impurities. The simultaneous action of hydrodynamic cavitation, electrocoagulation and the coagulants and active chemical species formed in situ provide a unique synergistic effect that results in a highly efficient purification process.

The electrocoagulation-based treatment of water, including purification of industrial waste water and sewage water, is based on using consumable sacrificial aluminum or iron anodes to release $Al^{3+}$ or $Fe^{2+}$ ions in the water:

$$Al \rightarrow Al^{3+} + 3e^- \text{ or } Fe \rightarrow Fe^{2+} + 2e^-. \tag{1}$$

When the water containing colloidal particles, oil, biological species, metals or other contaminants passes through an applied electric field, the water and its constituents undergo ionization, electrolysis, hydrolysis, seeding, de-emulsifying, halogen complex formation, oxidation, bleaching, etc., all of which results in the formation of radicals. The anode metal ions initiate coagulation by neutralizing the electrostatic charges on suspended solid particles, oil droplets and microorganisms followed by removal of undesirable contaminants via co-precipitation, coalescence or coagulation and separation of flock and debris by flotation, filtration or other techniques. The electrocoagulation treatment prompts precipitation of certain metals, depending on the anode material, pH and other conditions.

The primary reaction that occurs on the cathode surface is:

$$2H_2O + 2e^- \rightarrow H_2 + 2OH^-. \tag{2}$$

With an aluminum anode the overall reaction is:

$$2Al + 6H_2O \rightarrow 2Al(OH)_3 + 3H_2, \tag{3}$$

such that the aluminum hydroxide precipitates out.

With an iron anode, the dissolved oxygen is evolved due to the following electrochemical reactions:

$$2H_2O \rightarrow O_2 + 4H^+ + 4e^-; \text{ and}$$

$$2OH^- \rightarrow O_2 + 2H^+ + 4e^- \tag{4}$$

which rapidly oxidizes the released $Fe^{2+}$ ions to $Fe^{3+}$ ions according to the following reaction:

$$4Fe^{2+} + O_2 + 4H^+ \rightarrow 4Fe^{3+} + 2H_2O, \tag{5}$$

followed by the precipitation of insoluble ferric hydroxide in the following:

$$Fe^{3+} + 3OH^- \rightarrow Fe(OH)_3. \tag{6}$$

The released anode metal ions can either react directly with negatively charged contaminants or contaminants can be removed by adsorption on the aluminum or ferric hydroxide precipitates. The iron anode reaction shifts the pH value toward more basic values and the electrochemical reactions decrease the pH value. Taking into account the overall electrochemical reactions, formation of various by-products and ion exchange one should expect more neutral pH values with the electrocoagulation treatment than with a conventional chemical coagulation procedure.

The amount of sacrificial anode metal to be dissolved during the electrocoagulation can be calculated by using Faraday's law: m=ItM/zF, where m is the amount of the dissolved anode material (g), I is the current (A), t is the electrolysis time (s), M is the molecular weight (g/mol), z is the number of electrons involved in the electrochemical reaction, and F is the Faraday's constant ($9.648 \times 10^4$ A·s/mol). Other conditions being equal, the electrocoagulation outcome is affected mainly by the current density, conductivity, pH, temperature, treatment time and anode material. (Barrera-Diaz, et al., 2006; Bazrafshan et al., 2008; Heidmann et al., 2008; Gu et al., 2009.)

Electrocoagulation has a number of advantages over conventional chemical coagulation. Commonly used chemical coagulants in the treatment of wastewater prior to its disposal and in the reuse of wastewater include $KAl(SO_4)_2 \cdot 12H_2O$ and $FeCl_3 \cdot 6H_2O$. The chemical coagulants introduce substantial amounts of anions and acidic species along with metal cations, are characterized by a low concentration of the coagulants and, therefore, require the usage of large quantities of salts. For example, 1,000 kg $KAl(SO_4)_2 \cdot 12H_2O$ contain only 51.7 kg (5.17%) of $Al^{3+}$.

Another important advantage of electrocoagulation compared to chemical coagulation is the compactness of the related equipment and the relative simplicity of its handling and operation. (Gu et al., 2009; Canizares et al., 2009.) Electrocoagulation apparatuses can be single-flow, multi-flow or hybrid-type devices. Usually, the electrodes are placed 5-20 mm apart and separated with insulating inserts to prevent circuit faults. In a single-flow device, fluid under treatment passes through a passage formed by a network of the interelectrode channels. In a multi-flow device, multiple fluidic flows move simultaneously through the parallel interelectrode channels. The direction of fluidic flow can be horizontal or vertical. The flow directed from the bottom up is preferred because it facilitates the removal of gases and solid particles formed during the electrocoagulation process. Electrocoagulation consumes 3-12 watt-hour per gram of the dissolved anode metal. In practice, power consumption is higher due to heating water, electrode polarization, oxide film formation and other processes. Therefore, the electrode surfaces and the interelectrode zones are periodically cleaned of debris with proper mechanical tools.

Cavitation can be of many origins, including acoustic, hydrodynamic, laser-induced or generated by injecting steam into a cool fluid. Acoustic cavitation requires a batch environment and cannot be used efficiently in continuous processing, because energy density and residence time would be insufficient for a high-throughput. In addition, the effect of acoustic cavitation diminishes with an increase in distance from the radiation source. Treatment efficacy also depends on container size as alterations in the fluid occurs at particular locations, depending on the acoustic frequency and interference patterns.

When a fluid is fed in a flow-through hydrodynamic cavitation device at a proper velocity, cavitation bubbles form as a result of the decrease in hydrostatic pressure inside the specially designed passages. When the cavitation bubbles transition into a slow-velocity, high-pressure zone, they implode. Such implosion is accompanied by a localized increase in both pressure and temperature, up to 1,000 atm and 5,000° C., and results in the generation of local jet streams, shock waves and shearing forces. The release of a significant amount of energy activates atoms, ions, molecules and radicals located in the bubbles and/or the adjacent fluid and drives chemical reactions and processes. The bubble implosion can be coincidental with the emission of light, which catalyzes photochemical reactions. (Suslick, 1989; Didenko et al., 1999; Suslick et al., 1999; Young, 1999; Gogate, 2008; Mahulkar et al., 2008; Zhang et al., 2008.)

U.S. Patent Applications Publication Nos. 2006/0081541 (Kozyuk) and 2007/0102371 (Bhalchandra et al.), and U.S. Pat. Nos. 5,393,417 and 5,326,468 to Cox and U.S. Pat. No. 4,990,269 to Pisani et al. disclose methods and apparatuses that use cavitation for the treatment and purification of water and other fluids.

U.S. Pat. No. 6,325,916 to Lambert and Kresnyak discloses a method and apparatus for removing contaminants from water that uses hydraulic cavitation treatment of contaminated water following the oxidation of water contaminants with a gaseous oxidant. The cavitation generates foam that transports a flock in a separate phase. The process may be augmented by electrocoagulation. By placing an electric cell within the reservoir with the water under treatment and exposing the electrodes to a current source, the contaminants within the aqueous medium are oxidized or degraded and this complements the oxidation by the dissolved gaseous oxidant.

Russian Patent No. 2316481 to Sister describes a method of purification of waste water from surface-active substances, in which the water is subjected to ultrasonic cavitation at a sound radiation intensity of 1.5-3 W/cm$^2$. Then the electrode set is connected to a DC source and an ultrasound and electrocoagulation are applied simultaneously at the ultrasound intensity of 1.2 W/cm$^2$ with a subsequent purification of wastewater with electrocoagulation. All stages of this water treatment are carried out in one electrochemical reactor.

The known methods of water purification that employ both electrocoagulation and cavitation use them in a periodic manner, which reduces the process output, and requires using rather complex equipment.

SUMMARY OF THE INVENTION

The invention discloses a method and device for the efficient purification of water and other fluids from contaminants, the method and device being based on the simultaneous actions of both hydrodynamic cavitation and electrocoagulation. In the method, a fluid flow moves through narrow passages between adjacent electrodes with a non-flat or patterned surface. The fluid flow moves at a high rate to generate hydrodynamic cavitation features in the fluid flow.

The method for water treatment comprises the simultaneous application of flow-through hydrodynamic cavitation and electrocoagulation to a contaminated fluid flow. Preferably, the fluid is subjected to hydrodynamic cavitation on its own prior to the simultaneous application of hydrodynamic cavitation and electrocoagulation. The hydrodynamic cavitation is preferably a high-throughput process.

Figure 3A:
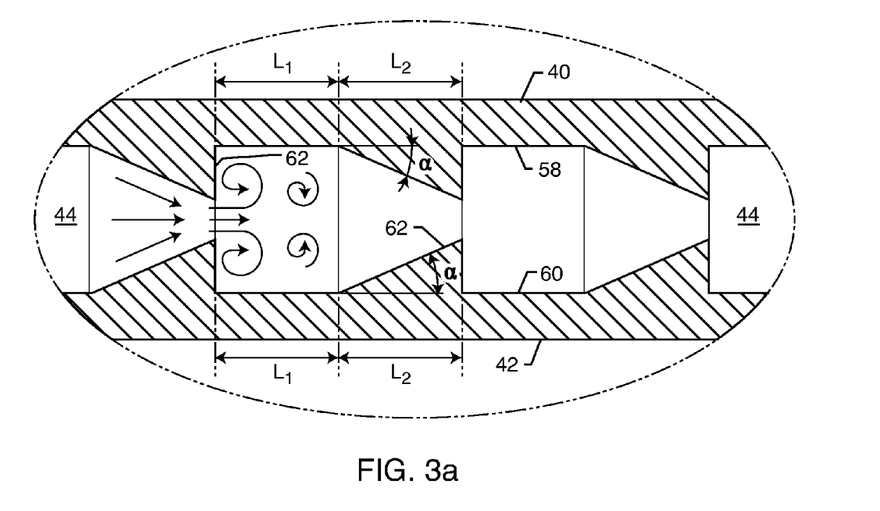
FIG. 3a illustrates a coaxial view of the interelectrode gap indicated by circle 3 in FIG. 2.
Figure 3B:
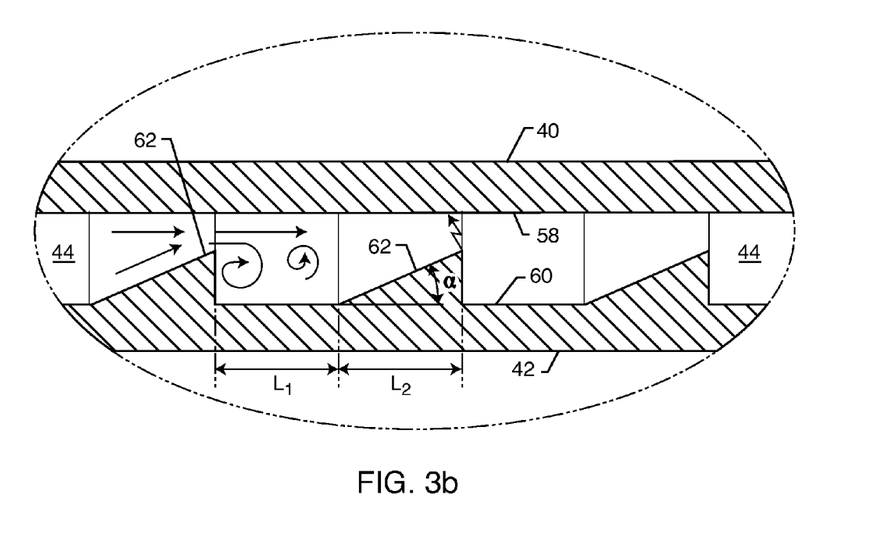
FIG. 3b illustrates a coaxial view of an alternate embodiment of the interelectrode gap at circle 3 of FIG. 2.

The reactor in which the fluid flow is subject to hydrodynamic cavitation and electrocoagulation comprises an inlet sleeve provided with channels having both constrictions and expansions. The channels are preferably shaped as Venturi tubes. The reactor includes contact surfaces on a hollow cathode and an inner cylindrical anode. The contact surfaces are provided with ring-type patterned features or protuberances. The patterned contact surfaces preferably include electrode superficial patterns comprising threads or right triangles. The electrode surface patterns may also comprise rectangular triangle cross-sections having a long leg parallel to the electrode axis and a short leg perpendicular to the electrode axis. The angle between the large leg and the hypotenuse of the rectangular triangle is preferably between fifteen degrees and sixty degrees. The distance between the nearest points on neighboring protuberances (L1) and the length of the large leg (L2) (FIG. 3$b$) preferably has a ratio of between zero and ten (L1/L2 is less than or equal to 10).

Accordingly, besides the objects and advantages of the high-speed fluid upgrading described herein, several objects and advantages of the present inventions are:

To provide a method that provides a high-throughput combined with a high efficiency of water purification.

To provide a method that does not require periodic shutdown of the unit for electrode surface cleaning.

To provide a method that allows simultaneous action of hydrodynamic cavitation, electrolysis and in situ coagulation to bring about a synergistic effect that results in a highly efficient purification.

To provide a compact apparatus, in which cavitation deactivates harmful microorganisms, creates vigorous mixing conditions and facilitates destruction and oxidation of contaminants by the electrocoagulation-generated active species.

To provide an apparatus that promptly generates changes in a fluid flow's velocity, pressure, temperature, voltage, resistance and chemical composition and properties.

The present invention is directed to a cavitation and electrocoagulation reactor. The reactor includes a hollow cylindrical cathode having an inner contact surface. A cylindrical anode having an outer contact surface is coaxially disposed within the cathode. The cathode contact surface and anode contact surface form an annular interelectrode gap therebetween. An inlet sleeve is disposed in an inlet of the cathode and abuts a first end of the anode sealing the interelectrode gap from the cathode inlet. The cathode inlet is in fluid communication with the interelectrode gap through a set of channels disposed in a wall of the inlet sleeve. An outlet sleeve is disposed in an outlet of the cathode and abuts an opposite second end of the anode sealing the interelectrode gap from the cathode outlet. The interelectrode gap is in fluid communication with the cathode outlet through a set of openings disposed in a wall of the outlet sleeve. An electrical source having a first terminal and a second terminal is connected to the reactor. The first terminal sealingly passes through either the inlet sleeve or the outlet sleeve and is electrically connected to the anode. The second terminal is electrically connected to the cathode.

The inlet sleeve and outlet sleeve are made from an electrically insulating material to prevent electrical shorts. Each of the set of channels in the inlet sleeve wall is uniformly and radially distributed around the perimeter of the inlet sleeve. Each of the set of channels has both constrictions and expansions in their cross-sectional area. Preferably each of the set of channels is shaped as Venturi tubes. Each of the set of openings in the outlet sleeve wall is uniformly and radially distributed around the perimeter of the outlet sleeve. Each of the set of openings is cylindrical. Preferably the total cross-sectional area of the set of openings is greater than or equal to the smallest cross-sectional area of the interelectrode gap.

The contact surfaces of the cathode and the anode are coated with a mixed metal oxide. The contact surfaces of the cathode and anode preferably have annular patterned features. The annular patterned features preferably comprise threads or triangular cross-sections. The triangular cross-sections have a long side and a short side, wherein the long side is oriented parallel to a longitudinal axis of the anode and the short side is oriented perpendicular to the longitudinal axis of the anode. The angle between the long side and the hypotenuse of the triangular cross-sections is preferably in the range of fifteen degrees to sixty degrees. Preferably, the ratio of the distance between adjacent annular patterned features (L1) to the length of the long side (L2) is in the range of zero to ten.

The method for removing contaminants from a contaminated fluid flow comprises the steps of generating hydrodynamic cavitation in the contaminated fluid flow. Such contaminated fluid flow is simultaneously exposed to an applied electric field from a sacrificial metal anode. Radicals of the contaminated fluid flow and its constituents are formed by the simultaneous hydrodynamic cavitation and exposure to the electric field. The contaminants in the contaminated fluid flow are coagulated as a result of the radical formation. The coagulated contaminants are then separated from the contaminated fluid flow resulting in a purified fluid flow. The generating, exposing, forming and coagulating steps are preferably carried out in a cavitation and electrocoagulation reactor as described above. The electric field is preferably applied using an anode made from aluminum or iron. The forming step includes the step of reacting the contaminated fluid flow in an ionizing, electrolyzing, hydrolyzing, seeding, de-emulsifying, halogen complex forming, oxidizing, or bleaching reaction, and producing aluminum or iron ions from the anode. The coagulating step also includes the step of neutralizing electrostatic charges on the contaminants using the anode metal ions. The separating step is achieved by co-precipitation, flotation or filtration.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
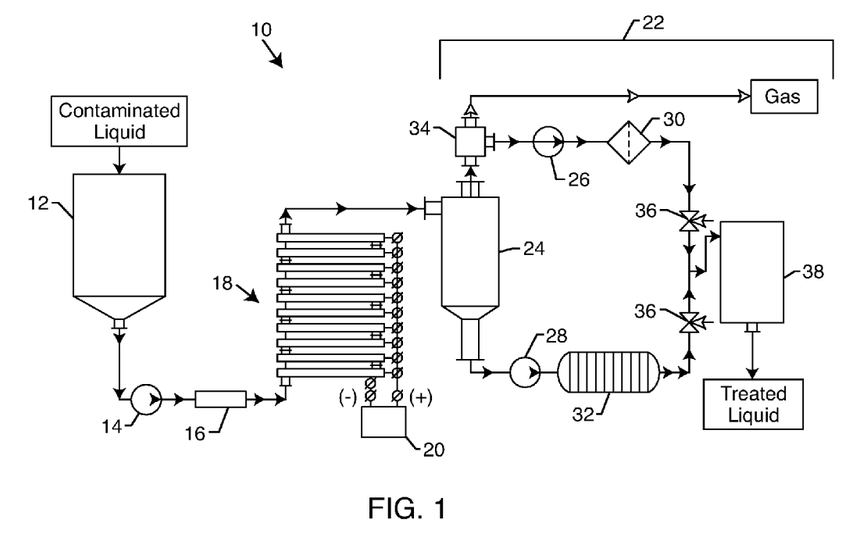
FIG. 1 illustrates the high-throughput cavitation and electrocoagulation apparatus.

A principal diagram of a possible high-throughput cavitation electrocoagulation system 10 is depicted in FIG. 1. The system 10 is comprised of the several parts that make it possible to efficiently treat contaminated water and remove various contaminants therefrom by using electrocoagulation simultaneously with flow-through hydrodynamic cavitation. The system 10 consists of inlet tank 12, which is filled with fluid to be purified. A high-pressure pump 14 feeds the fluid to a pre-cavitation-generating unit 16 for the cavitation pre-treatment of the fluid. A set of the inventive high-throughput cavitation and electrocoagulation reactors 18 provide the simultaneous application of hydrodynamic cavitation and an electric field, to impose electrochemical, heat and mechanical action on the fluid to be purified. A controlled electrical source with DC output 20 is connected to the reactor 18. A separation system 22 for removal of solid and gaseous flock and debris from the fluid to be purified follows the reactors 18. In this embodiment, the separation system 22 is comprised of a hydraulic cyclone 24, a pump 26 for fluid transfer, a pump 28 for slurry transfer, a fine filter 30, a frame filter 32, a pressure relief pipe 34, back-pressure valves 36 and a tank for the treated water 38.

In the pre-cavitation-generating unit 16, macro vortexes are generated in the fluid flow, which is accompanied by a local pressure decrease to the saturated vapor point of the fluid at the given temperature. When this happens, the proper conditions for the growth of cavitation nuclei in the cavitation bubbles is reached. The formed cavitation bubbles pulse and implode in downstream high-pressure zones. Such action is described in U.S. Pat. No. 7,762,715 and co-pending application Ser. No. 12/464,646, the disclosures of which are incorporated herein.

Figure 2:
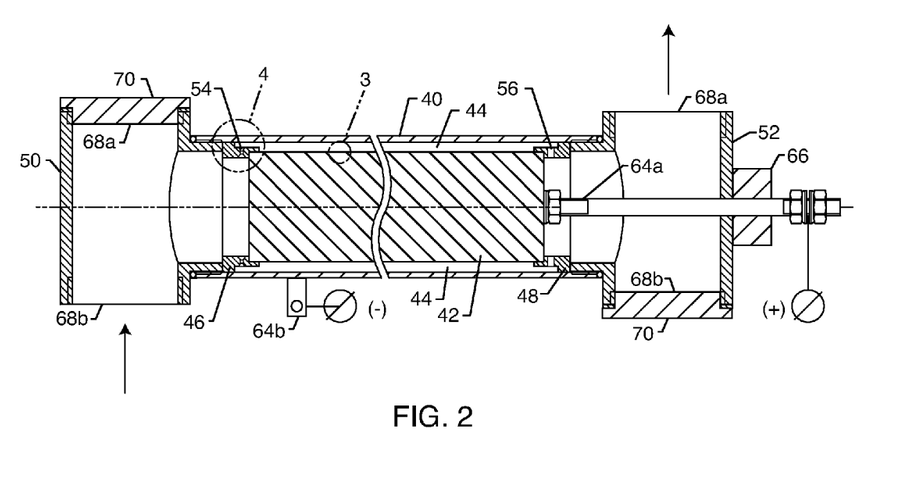
FIG. 2 illustrates the high-throughput cavitation and electrocoagulation reactor.

The inventive high-throughput cavitation and electrocoagulation reactor 18 is shown in the FIG. 2. It is comprised of the hollow cylindrical cathode 40, which hosts the co-axial cylindrical anode 42 forming an interelectrode gap 44 therebetween. The interelectrode gap 44 forms the working chamber of the device 18. An inlet sleeve 46 and an outlet sleeve 48, both made of an electrically insulating material, abut against opposite ends of the anode 42. The electrodes 40, 42 can be made of iron, steel, aluminum, copper, titanium and other metals and their alloys. The surface of the electrodes 40, 42 is preferably covered with a coating, such as mixed metal oxides or other, if required. Both sleeves 46, 48 are installed inside the cathode 40 with the help of cathode inlet fitting 50 and cathode outlet fitting 52, respectively. The inlet sleeve 46 and outlet sleeve 48 electrically insulate the cathode 40 from the anode 42 and physically separate the interelectrode gap 44 from the cathode inlet 50 and cathode outlet 52, respectively.

Figure 4:
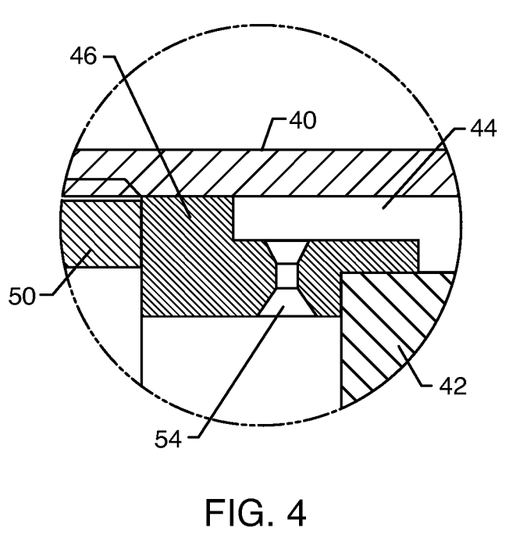
FIG. 4 illustrates a cross-sectional view of a channel in the inlet sleeve providing access to the interelectrode gap indicated by circle 4 of FIG. 2.

In the inlet sleeve 46, there are a plurality of channels 54 (FIG. 4), which place the cathode inlet 50 in fluid communication with the interelectrode gap 44. The channels 54 have both constrictions and expansions and are radially distributed evenly over the inner surface of the inlet sleeve 46. The channels 54 are preferably implemented in the form of Venturi tubes. The Venturi-type nozzle is a throttle device comprised of a conical inlet with a round profile, a cylindrical throat and a conical diffusor. The unsteady flows generated by the Venturi nozzles can be calculated by those skilled in the art. (Fedotkin and Gulyi, 2000; Mahesh et al., 2004; Li et al., 2008.)

The outlet sleeve 52 is provided with a plurality of cylindrical openings 56, which place the interelectrode gap 44 in fluid communication with the cathode outlet 52. The total cross-sectional area of these cylindrical openings 56 is greater than or equal to the smallest cross-sectional area of the interelectrode gap 44. This requirement must be met to ensure that the hydraulic resistance of the outlet sleeve openings 56 does not exceed that of the interelectrode gap 44.

The inner surface 58 of the cathode 40 and/or the outer surface 60 of the anode 42 are provided with patterns or protuberances 62 (FIG. 3a or 3b) that may be thread-like. The patterns 62 are designed to reduce the fluid pressure, resulting in the formation of cavitational features. The electrode surface patterns 62 preferably have rectangular or triangular cross-sections where the long side is parallel to the electrode axis and the short side is perpendicular to the same axis. As illustrated, the angle ($\alpha$) between the long side and hypotenuse of the triangle is an acute angle, preferably in the range of $15° \leq \alpha \leq 60°$. The distance (L1) between the nearest points of neighboring protrusions and the length (L2) of the long side are chosen in accordance with the following condition: $0 \leq L1/L2 \leq 10$.

The cylindrical anode 42 is attached to one terminal of a DC power source 64 that is preferably hosted by the outlet fitting 52 and sealed with a sealing 66. The hollow cathode 40 is connected to the other terminal of the DC power source 64. The inlet and outlet fittings 50, 52 are preferably double-socket, tee-branched flanges having upper and lower ports 68a and 68b. If multiple reactors 18 are connected in a series, then one of the outlet ports 68b and one of the inlet parts 68a are closed with caps 70. If the reactors 18 are assembled in parallel, the cap 70 is absent. A series assembly results in an increase of the processing time and efficiency. A parallel assembly increases the output, resulting in increased processing speed. FIG. 1 illustrates a series assembly.

The inventive flow-through cavitation and electrocoagulation system 10 functions as follows. Fluid to be treated enters the tank 12 and then is transferred by the pump 14 to the pre-cavitation device 16. The cavitation bubbles generated in the fluidic flow pulsate and implode resulting in heat and mass transfer processes and destruction of contaminants and pathogens. The collapse of cavitation bubbles produces enough energy for the dissociation of water molecules followed by the generation of protons, hydroxyl ions, hydroxyl radicals, peroxide and hydrogen molecules. Gas molecules present in these bubbles are excited and followed by multiple energy and charge exchange processes. Oxygen and hydrogen participates in a number of reactions, including the formation of hydroperoxyl radicals, while nitrogen gas may react with the formation of nitrogen dioxide or ammonia. The fluid is then transferred from pre-cavitation device 16 to a plurality of cavitation and electrocoagulation reactors 18, which can be assembled in either series or parallel configuration 3.

FIG. 2 illustrates a single reactor 18, where fluidic flow enters the reactor 18 through the inlet 50 and moves through the channels 54 to the interelectrode gap 44. The channels 54 are provided with the restrictions and the expansions, which aid in generating cavitation. The channels 54 are preferably fabricated in the shape of Venturi-type nozzles to separate vortices and generate pressure pulsations with characteristic frequencies. The fluid leaves the channels 54 and flows through the interelectrode gap 44 formed by the cathode inner surface and anode outer surface.

When the fluid flow moves over electrode surface protrusions 62, additional cavitational features are generated. The cavitation increases the efficiency of the various reactions, i.e., ionization, electrolysis, etc., on the fluid. Since the electrode surfaces 58, 60 are patterned, the width of the interelectrode gap 44 varies along the length of the reactor 18. This creates an uneven electric field along the fluidic flow passage, which causes electrical breakdown and results in an electrohydraulic shock on the fluid. The design of the interelectrode gap 44 provides conditions for alterations in velocity, pressure, voltage and resistance of the fluid flow to improve the efficiency of purification and disinfection of the treated fluid.

Cavitation and alternating flow friction also contribute to the clearing and renewal of the electrode surface, preventing passivation. Such actions also heat up the treated fluid. Evolution of oxygen, hydrogen and the cavitation-generated gases improves flotation efficiency and the removal of contaminants by separation processes.

High-intensity cavitation is achieved in the inventive cavitation and electrocoagulation reactor 18 by reducing fluidic flow discharge and increasing the pressure drop between the inlet and outlet reactor sleeves 50, 52. Such fluidic flow discharge of the reactor (Q) is typically a function of the square root of the pressure drop ($\sqrt{\Delta P}$) between the reactor inlet and outlet. An increase in both the concentration and the size of cavitation bubbles decreases the interelectrode cross-sectional area available for fluid flow. As the hydrolytic resistance increases sharply, Q is no longer proportional to the square root of the change in pressure.

After the reactors 18 the fluid moves in a cyclone separator 24. The fluid off the bottom—now a slurry—is pumped with by pump 28 to filter 32, while the gas separator 34 separates gas and the purified fluid, which is transferred by pump 26 to the fine filter 30 and then collected in vessel 38. Because of the cavitation and electrocoagulation processes, the standard separation processes are quicker and more efficient at producing a purified fluid. To prevent overflows the system is equipped with cut-off valves 36.

Figure 5A:
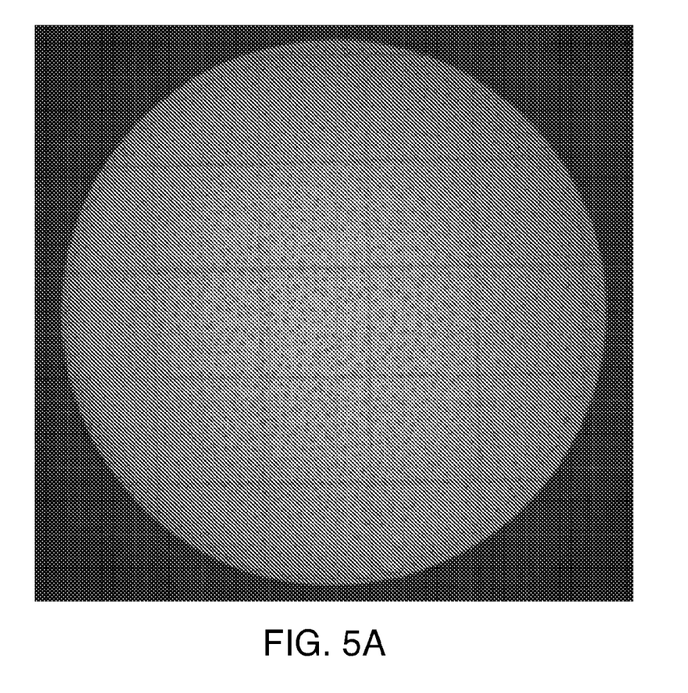
FIGS. 5a and 5b depict photographs of a sample of swamp water before and after processing for purification in the cavitation and electrocoagulation reactor of the present invention.
Figure 5B:
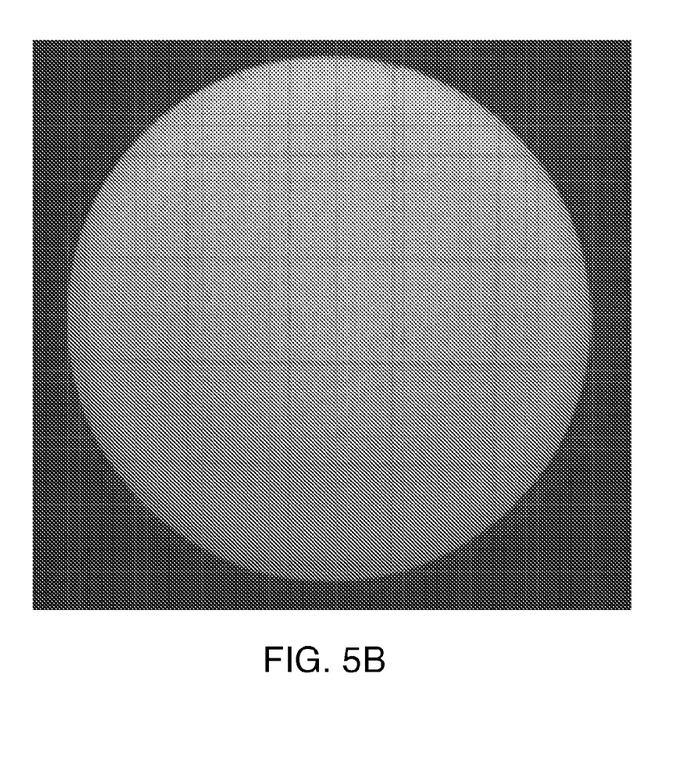

FIGS. 5a and 5b depict photographs of a sample of river/pond water contaminated with *E. coli* and coliform bacteria both before and after processing in a reactor 18 of the present invention. In both photographs the sample of swamp water is photographed in a 3M® Petrifilm® coliform count plate to facilitate the count of bacteria cells. FIG. 5a illustrates viable cells of contaminants in the water prior to processing. FIG. 5b illustrates the same sample after processing showing a dramatic decrease in the concentration of viable bacterial cells. The sample of water was diluted with tap water in a 1:1 ratio and then processed in the inventive reactor 18 at a rate of ten gallons per minute with electricity supplied at 2-5 volts and 30-60 amperes. Total processing time was one minute. One milliliter of the mixture both before and after processing was pipetted onto the count plate and kept at 30° C. for two days. As can be seen from a comparison of the two images, such processing resulted in complete removal of the bacterial contaminants.

Figure 6:
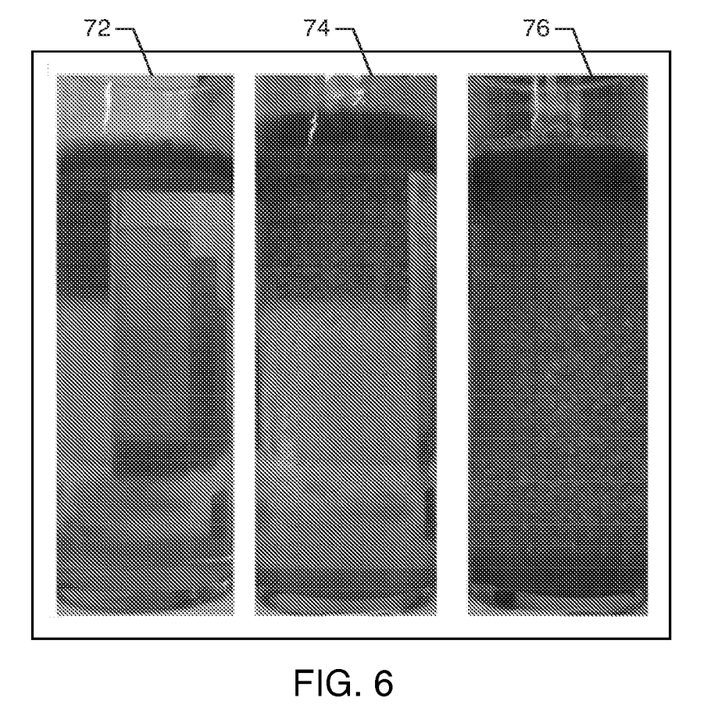
FIG. 6 depicts a photograph of three portions of a sample of sea water at various stages of separation after processing in a cavitation and electrocoagulation reactor of the present invention.

FIG. 6 is a photograph depicting three separate portions of a sample of sea water at different stages of separation after being processed in the inventive reactor 18. The sea water was collected from a pier in Santa Monica, Calif. In the left-most beaker 72, phase separation is essentially complete following processing in the inventive reactor 18. The center beaker 74 contains another portion of the same sample of sea water where separation is approximately half completed. The right-most beaker 76 contains a portion of the same sea water sample immediately after processing in the inventive reactor 18.

Figure 7:
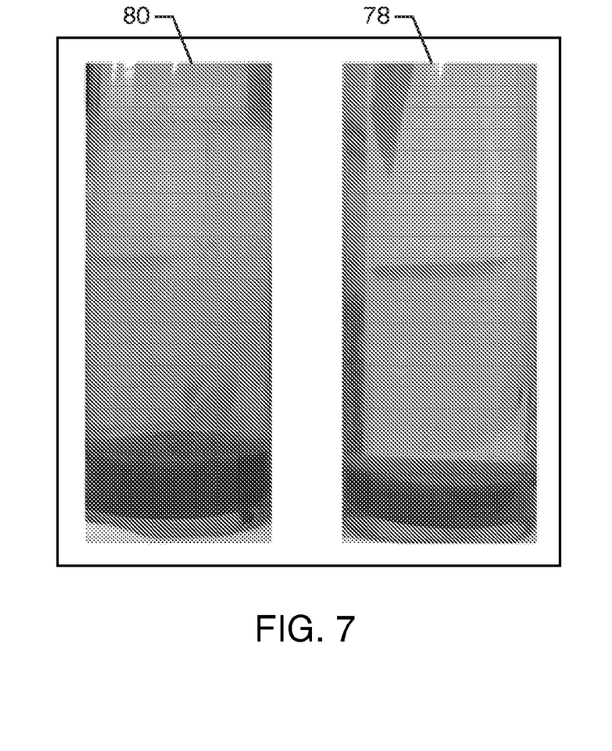
FIG. 7 is a photograph depicting two samples of natural sources of water illustrating the process of coagulation after treatment in a cavitation and electrocoagulation reactor of the present invention.

FIG. 7 is a photograph depicting two different samples of ocean water. The right-most sample 78 is from a water source containing low levels of contamination, wherein the sample has been processed in the inventive reactor 18. The left-most sample 80 is taken from a water source containing high levels of contamination, wherein the sample has also been processed in the inventive reactor 18. Both samples were passed through the reactor 18 at a rate of ten gallons per minute with electricity supplied at 12 volts and 40-80 amperes. Total processing time for both samples was one minute. No additives or coagulants were introduced in either sample. Such processing resulted in the complete removal of all contaminants, including organic substances and heavy metals.

While a preferred embodiment is shown and described, it will be understood that there is no intent to limit the invention by such disclosure, but rather is intended to cover all modifications and alternate constructions falling within the spirit and scope of the present invention. The following examples are given for illustrating the present invention and should not be construed as limitations on the scope or spirit of the invention. Accordingly, the scope of the present invention should be determined solely by the appended claims and their legal equivalents, rather than by the examples given.

What is claimed is:

1. A method for removing contaminants from a contaminated fluid flow, comprising the steps of:
    providing a cavitation and electrocoagulation reactor having a cylindrical anode coaxially disposed within a hollow cylindrical cathode defining an annular interelectrode cap therebetween;
    pumping the contaminated fluid flow through the annular interelectrode gap;
    processing the contaminated fluid flow in the cavitation and electrocoagulation reactor, wherein the processing step includes repeatedly generating and collapsing hydrodynamic cavitation bubbles in the contaminated fluid flow while in the annular interelectrode gap, and simultaneously exposing the contaminated fluid flow to an applied electric field generated by the cathode and the anode;
    forming radicals of the contaminated fluid flow and its constituents;
    coagulating the contaminants in the contaminated fluid flow; and
    separating the coagulated contaminants from the contaminated fluid flow resulting in a purified fluid flow.

2. The method of claim 1, wherein the electric field is applied using an anode made from titanium, aluminum or iron.

3. The method of claim 2, wherein the forming step comprises the steps of reacting the contaminated fluid flow in an ionizing, electrolyzing, hydrolyzing, seeding, de-emulsifying, halogen complex forming, oxidizing or bleaching reaction, and producing aluminum or iron ions from the anode.

4. The method of claim 1, wherein the anode is a sacrificial metal anode and the coagulating step includes the steps of releasing anode metal ions into the contaminated fluid flow and neutralizing electrostatic charges on the contaminants through interactions with the released anode metal ions.

5. The method of claim 1, wherein the separating step is achieved by co-precipitation, flotation or filtration.

6. The method of claim 1, wherein the presenting step includes coating surfaces of the cathode and the anode with a mixed metal oxide.

7. The method of claim 1, wherein the cavitation and electrocoagulation reactor includes an outlet sleeve disposed between the cathode and the anode, including a set of openings through the outlet sleeve, wherein the total cross-sectional area of the set of openings is greater than or equal to the smallest cross-sectional area of the interelectrode gap.

8. The method of claim 1, wherein contact surfaces of the cathode and the anode have annular patterned features such that the width of the interelectrode gap varies along the length of the cathode and the anode.

9. A method for removing contaminants from a contaminated fluid flow, comprising the steps of:
    providing a cavitation and electrocoagulation reactor having a cylindrical titanium anode coaxially disposed within a hollow cylindrical titanium cathode defining an annular interelectrode gap therebetween;
    coating surfaces of the anode and cathode in the interelectrode gap with a mixed metal oxide;
    pumping the contaminated fluid flow through the annular interelectrode gap;
    processing the contaminated fluid flow in the cavitation and electrocoagulation reactor, wherein the processing step includes repeatedly generating and collapsing hydrodynamic cavitation bubbles in the contaminated fluid flow while in the annular interelectrode gap, and simultaneously exposing the contaminated fluid flow to an applied electric field generated by the cathode and the anode;
    forming radicals of the contaminated fluid flow and its constituents;
    coagulating the contaminants in the contaminated fluid flow; and
    separating the coagulated contaminants from the contaminated fluid flow resulting in a purified fluid flow.

* * * * *